United States Patent
Kim et al.

(10) Patent No.: US 9,311,157 B2
(45) Date of Patent: Apr. 12, 2016

(54) METHOD AND APPARATUS FOR DYNAMIC RESOURCE ALLOCATION OF PROCESSING UNITS ON A RESOURCE ALLOCATION PLANE HAVING A TIME AXIS AND A PROCESSING UNIT AXIS

(75) Inventors: Kyoung Hoon Kim, Suwon-si (KR); In Choon Yeo, Suwon-si (KR); Seung Wook Lee, Suwon-si (KR); Joong Baik Kim, Seocho-gu (KR); Il Ho Lee, Suwon-si (KR); Jeong Ig Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/246,323

(22) Filed: Sep. 27, 2011

(65) Prior Publication Data

US 2012/0079498 A1 Mar. 29, 2012

(30) Foreign Application Priority Data

Sep. 27, 2010 (KR) ........................ 10-2010-0093330

(51) Int. Cl.
*G06F 9/46* (2006.01)
*G06F 9/455* (2006.01)
*G06F 9/50* (2006.01)

(52) U.S. Cl.
CPC ...... *G06F 9/5066* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 6,345,287 B1 | 2/2002 | Fong et al. | |
| 7,661,107 B1 | 2/2010 | Van Dyke et al. | |
| 2004/0123298 A1* | 6/2004 | Shebanow | 718/104 |
| 2005/0141554 A1 | 6/2005 | Hammarlund et al. | |

(Continued)

FOREIGN PATENT DOCUMENTS

| | | |
|---|---|---|
| CN | 1993677 | 7/2007 |
| CN | 101441580 | 5/2009 |

(Continued)

OTHER PUBLICATIONS

Kunis, R.; Runger, G., "Task-block identification and movement for layer-based scheduling algorithms," High Performance Computing and Simulation (HPCS), 2010 International Conference on , vol., No., pp. 132,139, Jun. 28, 2010-Jul. 2, 2010.*

(Continued)

*Primary Examiner* — Meng An
*Assistant Examiner* — Bradley Teets
(74) *Attorney, Agent, or Firm* — The Farrell Law Firm, P.C.

(57) ABSTRACT

A method and apparatus for dynamic resource allocation in a system having at least one processing unit are disclosed. The method of dynamic resource allocation includes receiving information on a task to which resources are allocated and partitioning the task into one or more task parallel units; converting the task into a task block having a polygonal shape according to expected execution times of the task parallel units and dependency between the task parallel units; allocating resources to the task block by placing the task block on a resource allocation plane having a horizontal axis of time and a vertical axis of processing units; and executing the task according to the resource allocation information. Hence, CPU resources and GPU resources in the system can be used in parallel at the same time, increasing overall system efficiency.

17 Claims, 16 Drawing Sheets

(56) References Cited

U.S. PATENT DOCUMENTS

| | | | | |
|---|---|---|---|---|
| 2006/0092161 | A1* | 5/2006 | Meeker | 345/505 |
| 2007/0021998 | A1* | 1/2007 | Laithwaite et al. | 705/9 |
| 2007/0030278 | A1* | 2/2007 | Prokopenko et al. | 345/506 |
| 2007/0030279 | A1* | 2/2007 | Paltashev et al. | 345/506 |
| 2008/0263555 | A1* | 10/2008 | Ventroux et al. | 718/103 |
| 2009/0049435 | A1* | 2/2009 | Luszczek et al. | 717/149 |
| 2010/0138810 | A1 | 6/2010 | Komatsu et al. | |
| 2010/0275213 | A1* | 10/2010 | Sakai | 718/104 |
| 2010/0318998 | A1* | 12/2010 | Golla | 718/104 |
| 2011/0067016 | A1* | 3/2011 | Mizrachi et al. | 717/149 |
| 2011/0314478 | A1 | 12/2011 | Louise et al. | |

FOREIGN PATENT DOCUMENTS

| | | |
|---|---|---|
| EP | 1 341 083 | 9/2003 |
| FR | 2 942 556 | 8/2010 |
| JP | 06-290159 | 10/1994 |
| JP | 2008-146503 | 6/2008 |
| JP | 2010-134614 | 6/2010 |
| JP | 2010-211544 | 9/2010 |
| WO | WO 2010/004474 | 1/2010 |
| WO | WO 2010/067377 | 6/2010 |

OTHER PUBLICATIONS

Kunis, R.; Runger, G., "Optimization of Layer-based Scheduling Algorithms for Mixed Parallel Applications with Precedence Constraints Using Move-blocks," Parallel, Distributed and Network-based Processing, 2009 17th Euromicro International Conference on, vol., No., pp. 70,77, Feb. 18-20, 2009.*

Chinese Office Action dated Oct. 9, 2015 issued in counterpart application No. 201180046468.9, 13 pages.

Japanese Office Action dated Nov. 2, 2015 issued in counterpart application No. 2013-530094, 7 pages.

* cited by examiner

FIG. 2
(PRIOR ART)
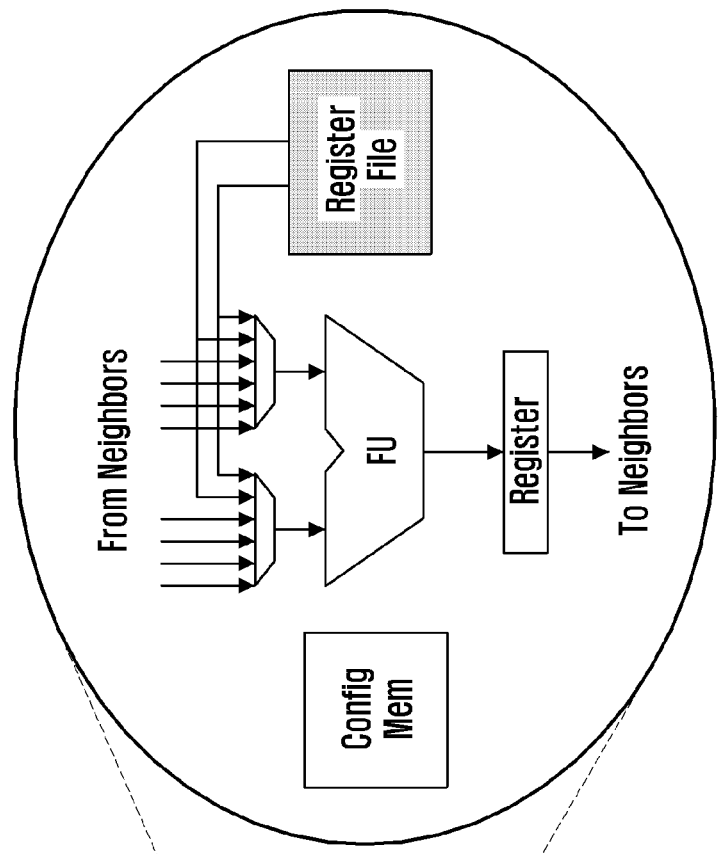
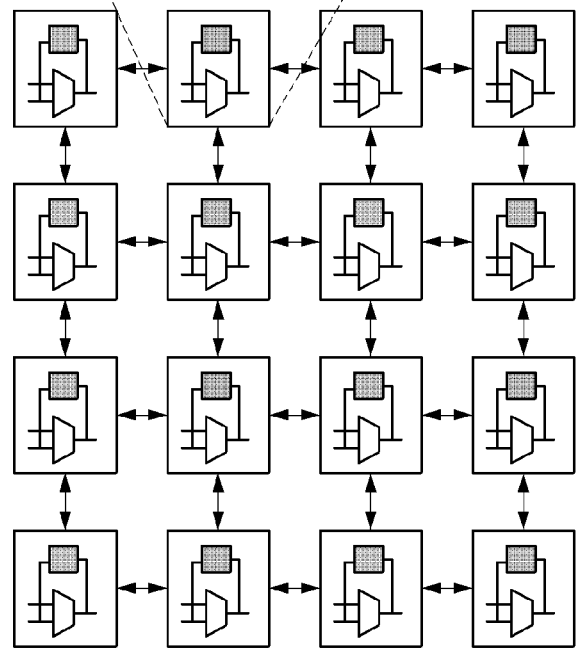

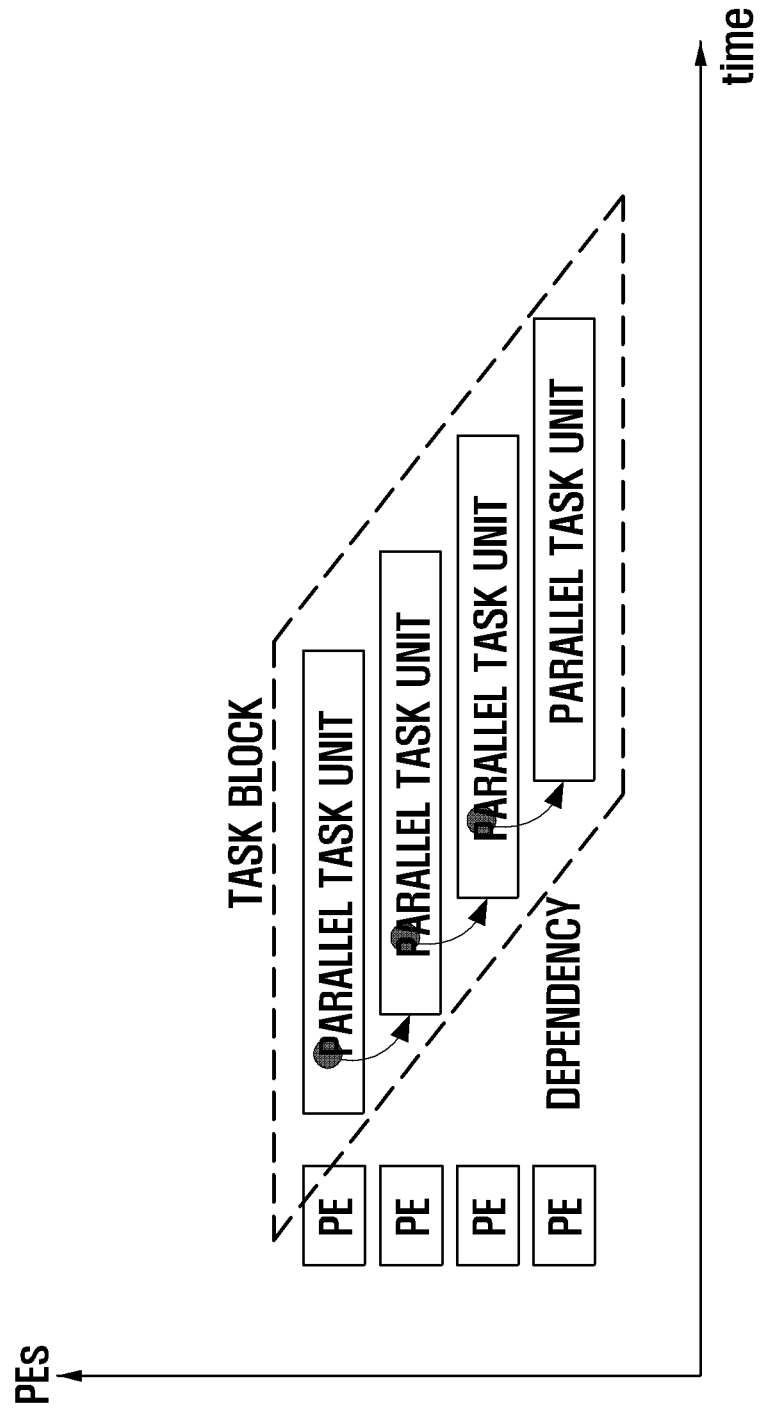

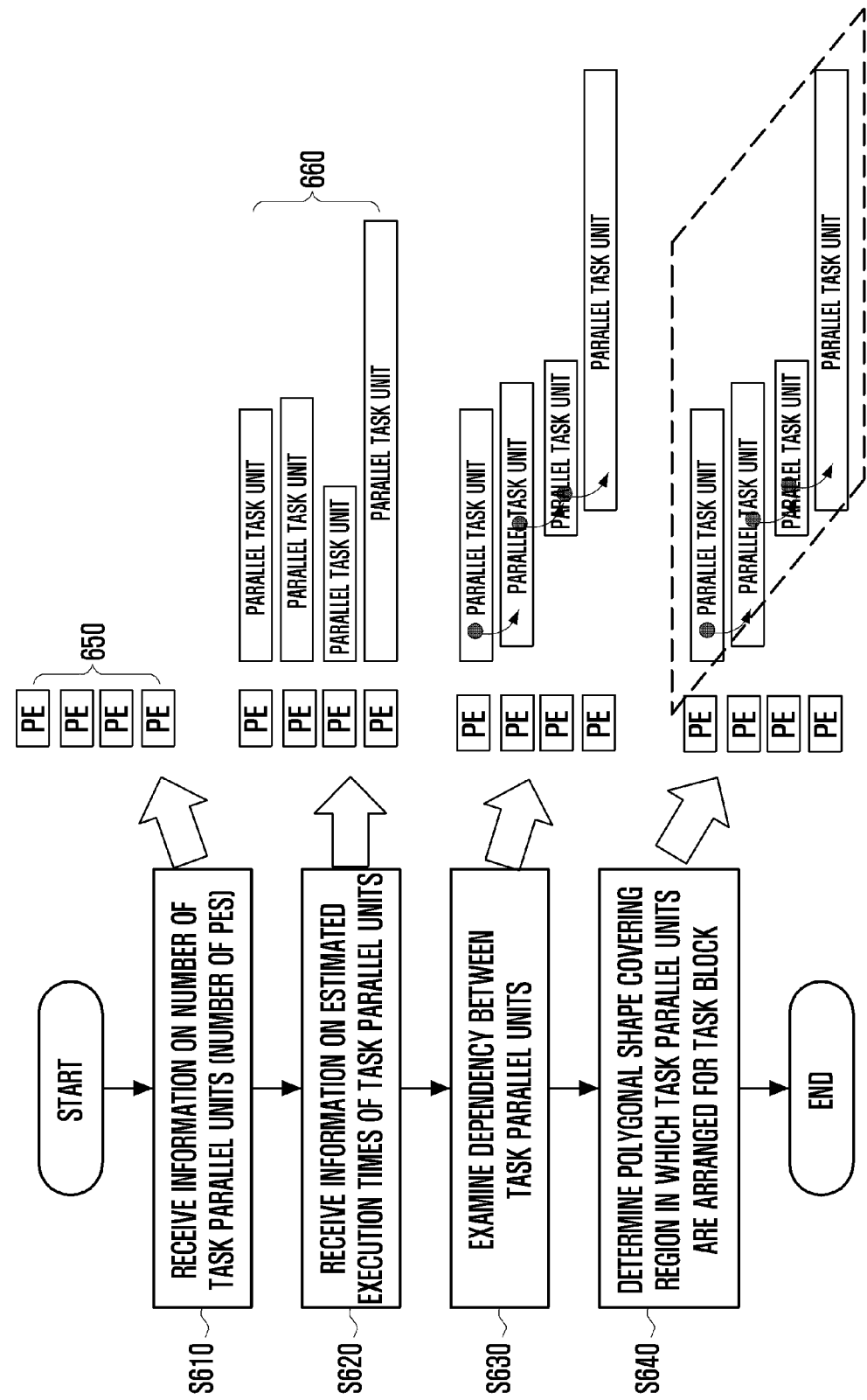

METHOD AND APPARATUS FOR DYNAMIC RESOURCE ALLOCATION OF PROCESSING UNITS ON A RESOURCE ALLOCATION PLANE HAVING A TIME AXIS AND A PROCESSING UNIT AXIS

PRIORITY

This application claims priority under 35 U.S.C. 119(a) to an application filed in the Korean Intellectual Priority Office on Sep. 27, 2010, and assigned Serial No. 10-2010-093330, the contents of which are incorporated herein by reference.

BACKGROUND OF THE INVENTION

1. Field of the Invention

The present invention relates generally to dynamic resource allocation of processing units and, more particularly, to a method and apparatus that perform dynamic resource allocation by assigning processing units to task blocks so that both Central Processing Unit (CPU) resources and Graphics Processing Unit (GPU) resources are efficiently utilized.

2. Description of the Related Art

Processing units, such as CPUs, GPUs and Coarse-Grained Reconfigurable Architectures (CGRA), may be realized using computational software. A CPU, GPU and CGRA are described in greater detail below with reference to FIGS. 1 and 2.

As illustrated in FIG. 1, a CPU 110 may include at least one core 115 that performs actual computation, and a 120 GPU may include at least one Processing Element (PE) 125 that performs actual computation. Further, in FIG. 1, both the CPU 110 and the GPU 120 are illustrated in connection with a memory 130.

Recently, processors having multiple cores or GPUs having multiple PEs have been widely employed. In particular, high-end processing units, such as GPUs, may include dozens to hundreds of PEs.

FIG. 2 illustrates a configuration of a coarse-grained reconfigurable architecture (CGRA). In a CGRA, many processing elements (function units, FUs) are arranged so that inputs and outputs are transferred therebetween for organized processing. Paths of data to be computed and FUs to process the data are adjusted in a dynamic manner. In the CGRA, as the name implies, the method and sequence to use arranged hardware components may be adjusted by software means in a relatively coarse-grained way not in a fine-grained way. One PE may rapidly perform a small operation and a large number of interconnected PEs may perform a large and complex operation. In FIG. 2, a number of PEs are interconnected by a mesh style network. Operands are computed through adjustable paths of PEs. One PE may receive inputs from neighbor PEs and produce outputs to neighbor PEs, and may have a register file to hold temporary values, a configuration memory providing reconfiguration information and an FU (ALU) to compute an operation.

As the number of processing units increases, it is crucial to efficiently manage resources, including these processing units, to enhance overall system performance.

In general, GPU processing is initiated when the CPU invokes the GPU. In order for the GPU to execute a task, the CPU may set a GPU register. Hardware threads have been utilized to execute multiple operations in parallel in the GPU. Using these hardware threads, processing elements may be grouped, and groups of processing elements may execute in parallel. As described above, systems generally evolve toward maximizing parallel operation execution.

However, existing techniques tend to sequentially utilize the CPU and the GPU. FIG. 3 is a diagram illustrating sequential processing of tasks using CPU and GPU resources. More specifically, FIG. 3 illustrates CPU 310 and GPU 320 utilization over time.

Referring to FIG. 3, the CPU 310, which is processing a task, invokes the GPU 320 at a particular point in time. While the GPU processes the task, the CPU waits for completion of the task at the GPU. However, the CPU may also process a different task or program. During GPU execution, not all processing elements may be utilized. Specifically, as shown in FIG. 3, only active processing elements 330 are used and the remaining processing elements 340 remain in idle state. When the processing of the task is ended at the GPU, the GPU returns the processing results to the CPU, which then continues subsequent processing.

As described above, in sequential resource utilization, the CPU and the GPU are not utilized simultaneously and not all processing elements of the GPU are used. When a task is not partitioned in the GPU, the whole GPU may be occupied by a single task. Since most application programs do not utilize all the processing elements of the GPU, GPU resources may be wasted, degrading system performance.

SUMMARY OF THE INVENTION

The present invention has been made to address at least the above problems and/or disadvantages and to provide at least the advantages described below. Accordingly, an aspect of the present invention provides a method and apparatus that perform dynamic resource allocation by assigning processing units to task blocks so that both CPU resources and GPU resources are efficiently utilized.

According to one aspect of the present invention, a method is provided for dynamic resource allocation for a system having at least one processing unit. Information on a task to which resources are to be allocated is received and the task is partitioned into one or more parallel task units. The one or more parallel task units are converted into a task block having a shape that is formed based on estimated execution times of the one or more parallel task units and whether dependency exists between the one or more parallel task units. Resources are allocated to the task block by placing the task block on a resource allocation plane having a time axis and a processing unit axis. The task is executed according to resource allocation information determined by the resource allocation plane.

According to another aspect of the present invention, an apparatus is provided for dynamic resource allocation in a system having at least one processing unit. The apparatus includes a dynamic resource allocation block that receives information on a task to which resources are to be allocated, partitions the task into one or more parallel task units, converts the one or more parallel task units into a task block having a shape that is formed based on estimated execution times of the one or more parallel task units and whether dependency exists between the one or more parallel task units, and allocating resources to the task block by placing the task block on a resource allocation plane having a time axis and a processing unit axis. The apparatus also includes at least one processing unit that executes the task according to resource allocation information determined by the resource allocation plane.

According to a further aspect of the present invention, an article of manufacture is provided for dynamic resource allocation for a system having at least one processing unit. The article of manufacture includes a machine readable medium containing one or more programs which when executed implement the steps of receiving information on a task to which resources are to be allocated and partitioning the task into one or more parallel task units; converting the one or more parallel task units into a task block having a shape that is formed based on estimated execution times of the one or more parallel task units and whether dependency exists between the one or more parallel task units; allocating resources to the task block by placing the task block on a resource allocation plane having a time axis and a processing unit axis; and executing the task according to resource allocation information determined by the resource allocation plane.

BRIEF DESCRIPTION OF THE DRAWINGS

The above and other aspects, features and advantages of the present invention will be more apparent from the following detailed description when taken in conjunction with the accompanying drawings, in which:

FIG. 2 is a diagram illustrating a configuration of a CGRA;

FIGS. 5A and 5B are diagrams illustrating task blocks generated by dynamic resource allocation of the system illustrated in FIG. 4, according to an embodiment of the present invention;

FIG. 6 is a flowchart illustrating a task block generation methodology, according to an embodiment of the present invention;

DETAILED DESCRIPTION OF EMBODIMENTS OF THE PRESENT INVENTION

Figure 1:
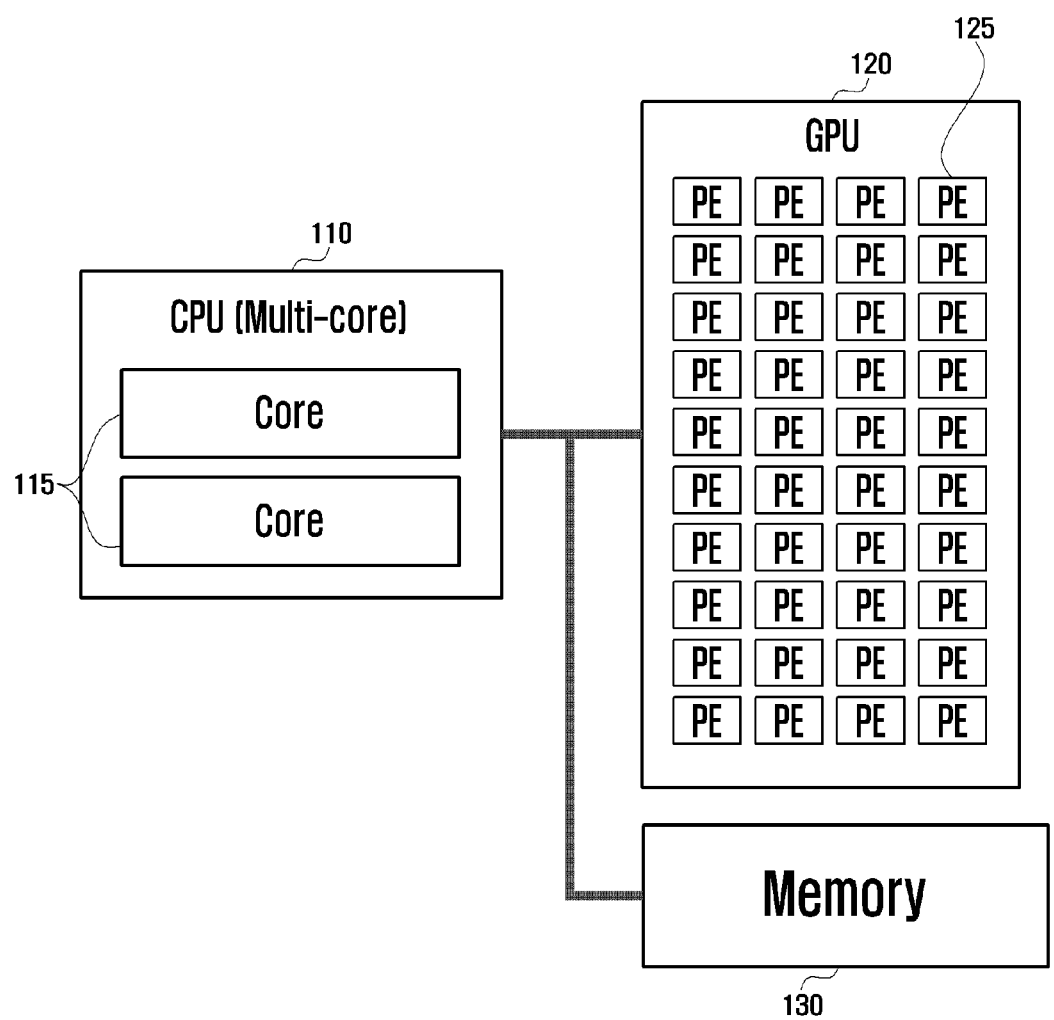
FIG. 1 is a diagram illustrating configurations of a CPU and GPU.
Figure 3:
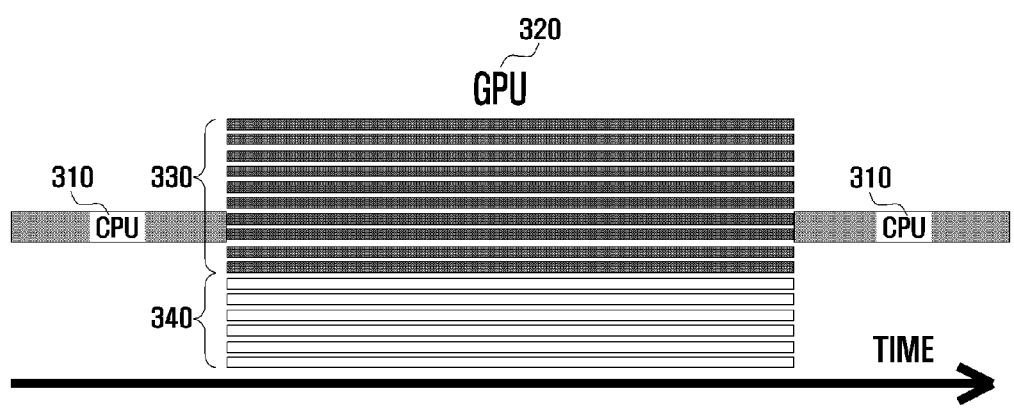
FIG. 3 is a diagram illustrating sequential processing of tasks using CPU and GPU resources.

Embodiments of the present invention are described in detail with reference to the accompanying drawings. The same or similar components may be designated by the same or similar reference numerals although they are illustrated in different drawings. Detailed descriptions of constructions or processes known in art may be omitted to avoid obscuring the subject matter of the present invention.

The present invention provides a dynamic resource allocation method and apparatus that enable efficient utilization of CPU and GPU resources.

Figure 4:
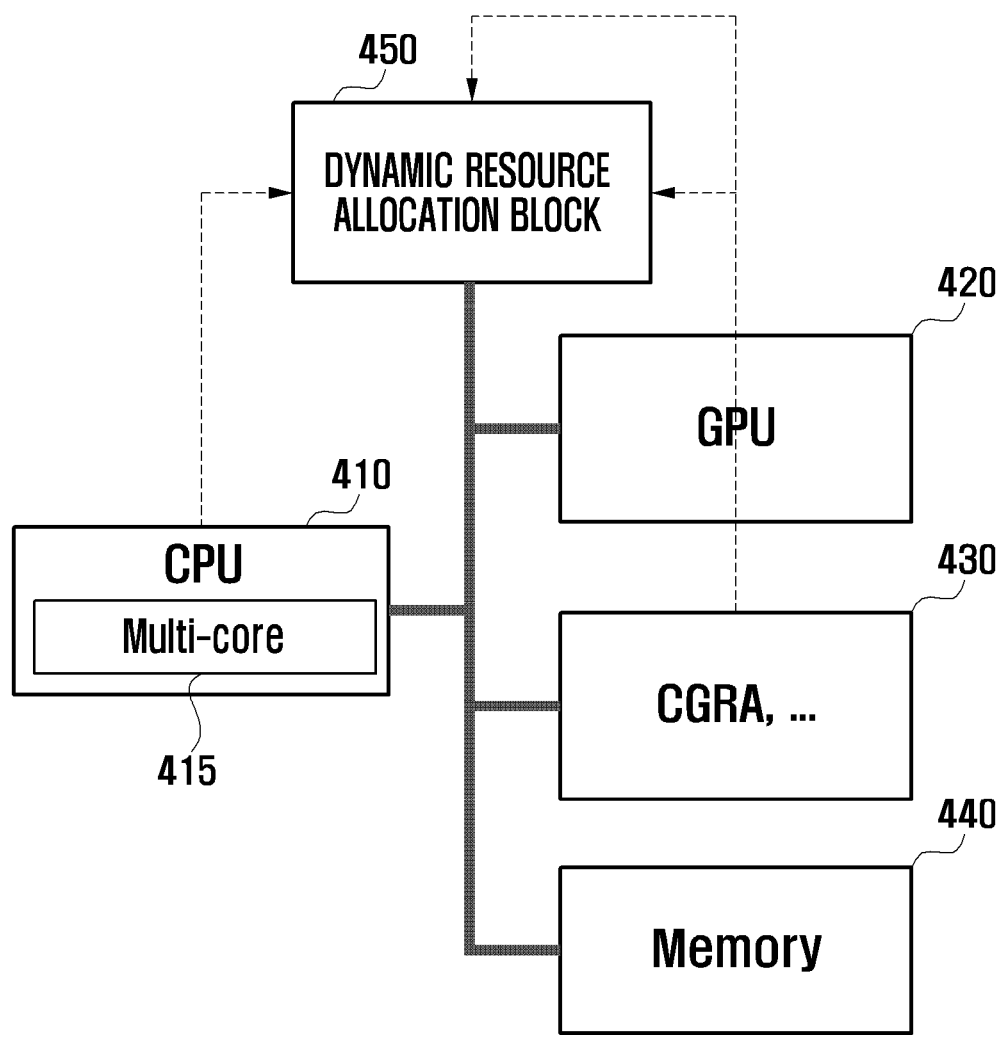
FIG. 4 is a block diagram illustrating a dynamic resource allocation system, according to an embodiment of the present invention.

FIG. 4 is a block diagram illustrating a dynamic resource allocation system, according to an embodiment of the present invention. The dynamic resource allocation system may include a CPU 410, a GPU 420, a CGRA 430, a memory 440, and a dynamic resource allocation block 450.

The CPU 410, GPU 420 and CGRA 430 are examples of processing units capable of processing tasks. In particular, the CPU 410 may be a multi-core processor 415 having multiple cores. The GPU 420 may not only perform graphics operations but may also process high-volume tasks in cooperation with the CPU 410. In order to achieve these functions, the GPU 420 may include multiple PEs. Processing units, including the CPU 410 and the GPU 420, provide information on a task to be processed to the dynamic resource allocation block 450, receive results of resource allocation from the dynamic resource allocation block 450, and process the task according to scheduling information.

The multiple cores of the CPU and the PEs of the GPU may have different structures and functions. However, because a core and a PE may be the same in view of task execution, they are both referred to as a PE in the following description. This may also be applied to other processing units composed of cores, or cores and PEs.

The memory 440 stores programs and related data necessary for overall operations of the dynamic resource allocation system.

The dynamic resource allocation block 450 converts a task to be processed by PEs into a task block. The task to be processed is partitioned into multiple parallel task units, and the parallel task units are arranged into a task block based on dependency between the parallel task units.

The dynamic resource allocation block 450 performs resource allocation by assigning PEs, which may execute in parallel, to the task block. In order to perform resource allocation, the dynamic resource allocation block 450 may receive current states (i.e., an active state or an idle state) of PEs from the PEs of the CPU and GPU. The dynamic resource allocation block 450 performs resource allocation only to PEs that are currently in the idle state.

The dynamic resource allocation block 450 is capable of performing resource allocation for a new task block and resource allocation for a task block that had its previous execution end early or late due to an error in an estimated execution time. Processes for generation of a task block and resource allocation are described in detail below with reference to FIGS. 5A-9, and a structure of the dynamic resource allocation block 450 is described in greater detail below with reference to FIG. 10.

Figure 5A:
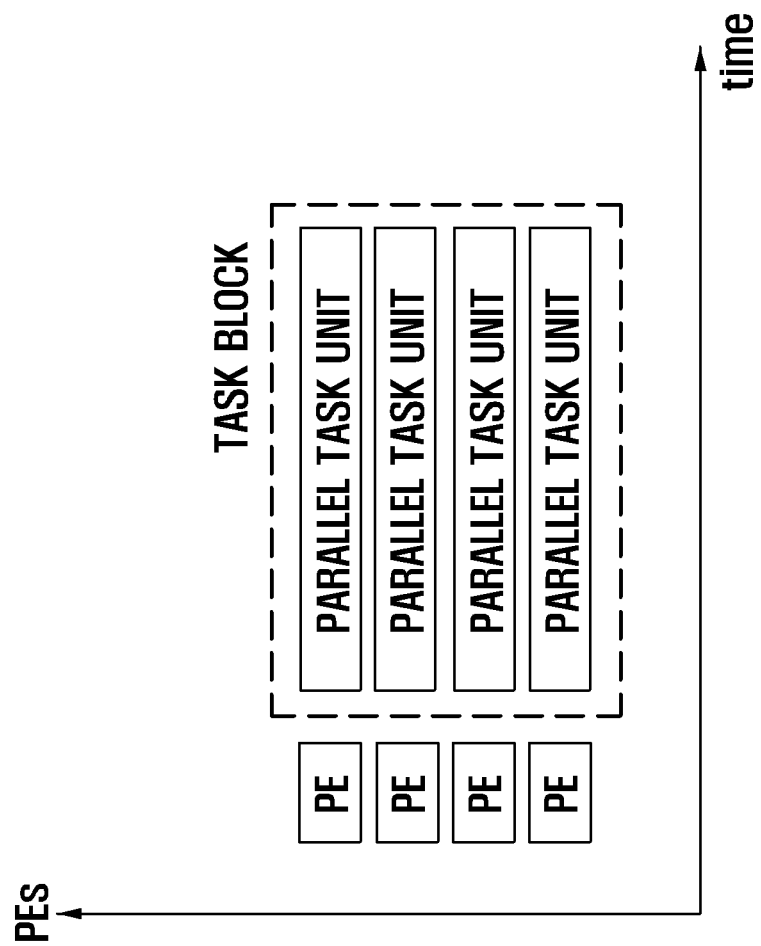

FIGS. 5A and 5B are a diagram illustrating a task block generated by the dynamic resource allocation block 450 of FIG. 4, according to an embodiment of the present invention. In FIGS. 5A and 5B, a horizontal axis denotes time and a vertical axis denotes PEs executing a task.

An application or application program may generate at least one task for execution, and the at least one task may be executed by at least one PE. For parallel processing of a single task using multiple PEs, as shown in FIGS. 5A and 5B, the single task is to be partitioned into multiple parallel task units. PEs may be assigned to the parallel task units in a one-to-one manner.

Dependency between parallel task units indicates that one parallel task unit requires the processing results of another parallel task unit. When there is no dependency between the parallel task units, the parallel task units may be processed at the same time by parallel PEs as illustrated by FIG. 5A. Accordingly, a task block has a rectangular form.

When there is dependency between two or more of the parallel task units, there are timing limitations in the processing order of the parallel task units. Accordingly, a task block has a trapezoidal form, as illustrated in FIG. 5B.

FIG. 6 is a flowchart illustrating a task block generation methodology performed by the dynamic resource allocation block 450 of FIG. 4, according to an embodiment of the present invention.

Referring to FIG. 6, the dynamic resource allocation block 450 obtains information on the number of parallel task units constituting a task, in step S610. The Operating System (OS) or the compiler may provide information relating to this number to the dynamic resource allocation block 450. The number of parallel task units that constitute a task may be determined at the time an application is created or at the time the application is compiled. When the number of parallel task units is known, the dynamic resource allocation block 450 may assign PEs 650 to the parallel task units 660. The PEs may be assigned to the parallel task units in a one-to-one manner.

The dynamic resource allocation block 450 obtains information on estimated execution times of the parallel task units from the operating system or the compiler, in step S620. The dynamic resource allocation block 450 may determine the length of each parallel task unit, which is proportional to the execution time thereof. Execution histories may be used to determine the length of a parallel task unit.

The dynamic resource allocation block 450 examines dependency between the parallel task units, in step S630. When a parallel task unit uses the processing results of another parallel task unit, dependency is present between the two parallel task units. The processing order of the parallel task units may be determined by the dependency therebetween.

The dynamic resource allocation block 450 determines a polygonal shape covering a region in which the parallel task units are arranged according to dependency, in step S640. When no dependency is present between the parallel task units, the polygonal shape may be set to a square or a rectangle. When dependency is present between the parallel task units, the polygonal shape may be set to a parallelogram. The shape of the parallelogram may contribute to improving the computation speed and efficiency. The slope of the parallelogram may vary according to the amount of dependency between parallel task units.

Figure 7A:
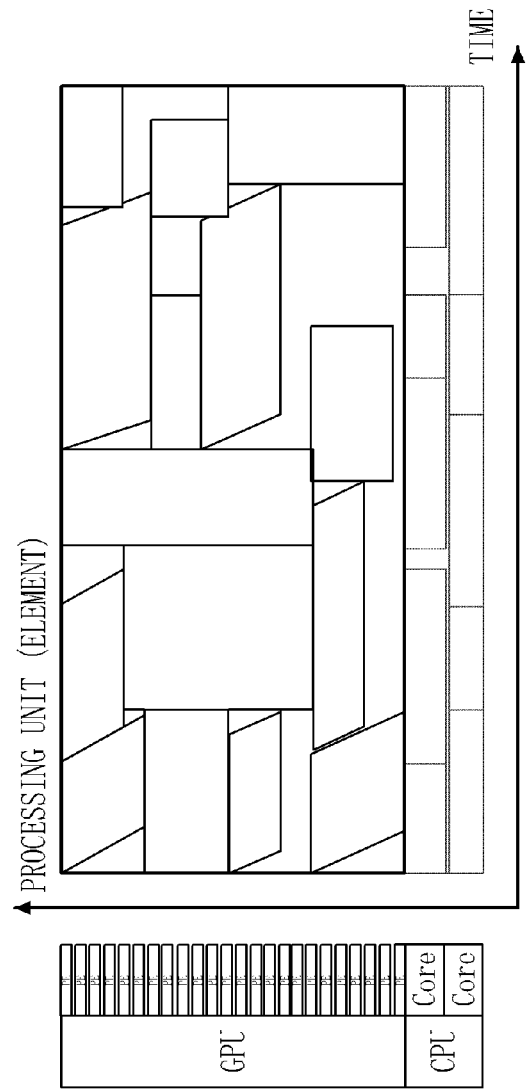
FIGS. 7A, 7B, and 7C are diagrams illustrating a rule for arranging task blocks on a resource allocation plane, according to an embodiment of the present invention.
Figure 7C:
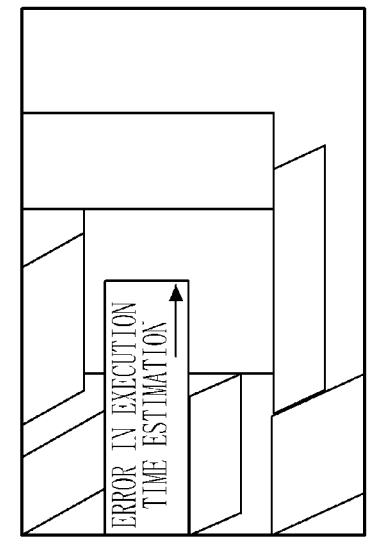
Figure 7B:
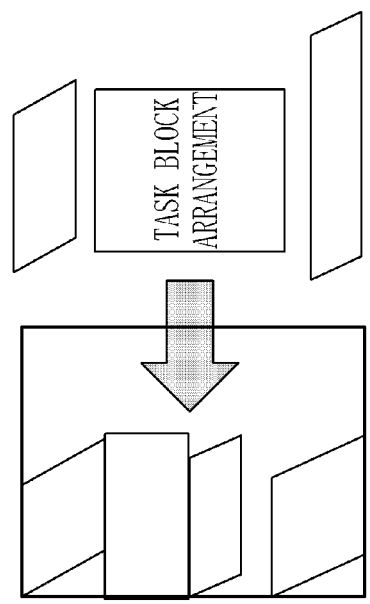

FIGS. 7A-7C are diagrams illustrating a rule for arranging task blocks on a resource allocation plane, according to an embodiment of the present invention.

The resource allocation plane of FIG. 7A has a horizontal axis indicating time and a vertical axis indicating processing units. As described above, processing units may include CPU resources (cores) and GPU resources (PEs). The resource allocation plane indicates usage of processing units or PEs as time passes.

Placement of task blocks on the resource allocation plane may have complexity of $O(n^3)$ according to the number of used processing elements, the number of tasks, expected execution times, and the slope due to dependency. O denotes the complexity and n denotes the number of used processing elements, the number of tasks, expected execution times, and the slope due to dependency.

A task block generated by the procedure of FIG. 6 is placed on the resource allocation plane. Placement of a task block on the resource allocation plane may correspond initial placement of task blocks for execution as illustrated in FIG. 7A, to additional placement of a new task block as illustrated in FIG. 7B, or to re-placement of a task block due to an error in the estimated execution time as illustrated in FIG. 7C.

Figure 8:
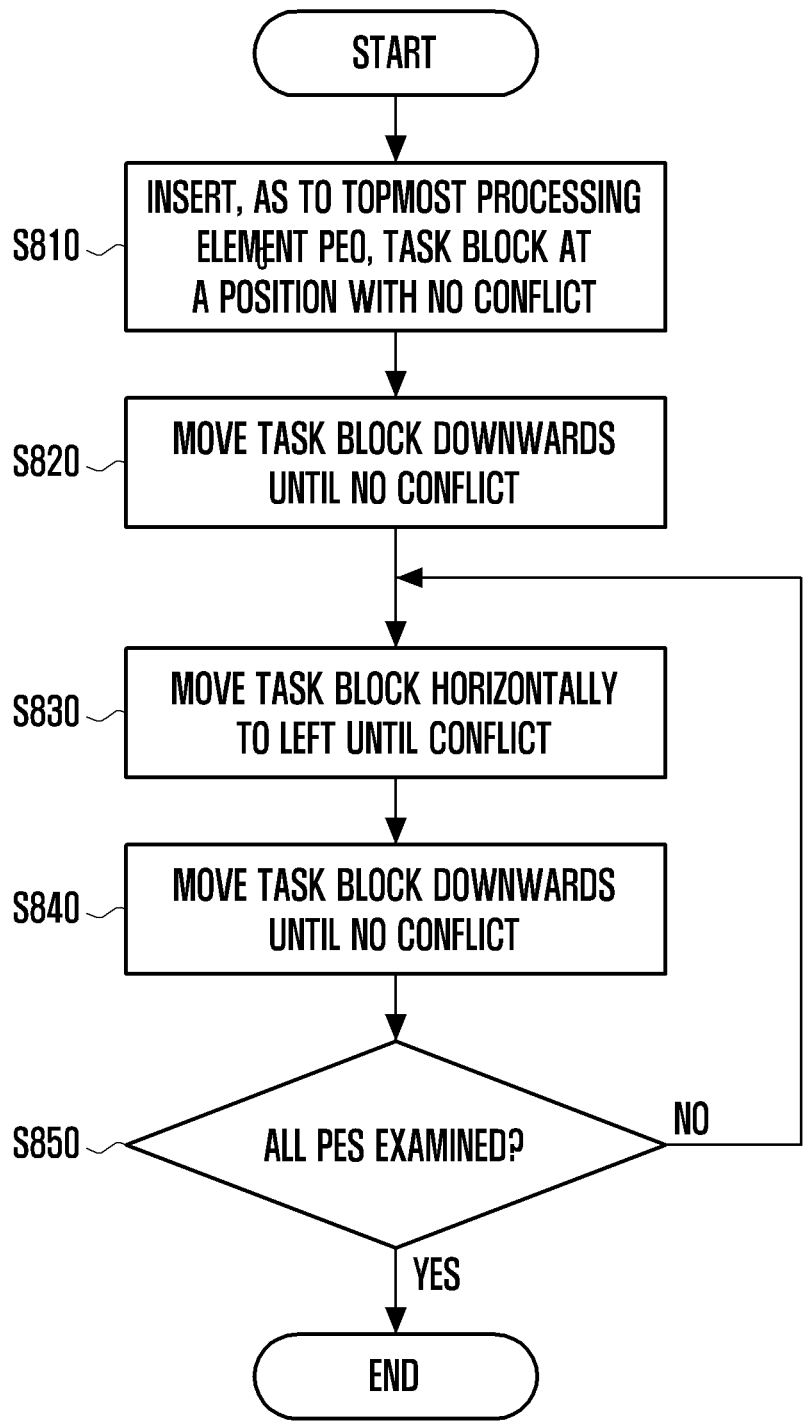
FIG. 8 is a flowchart illustrating a task block arrangement methodology on the resource allocation plane, according to an embodiment of the present invention.
Figure 9:
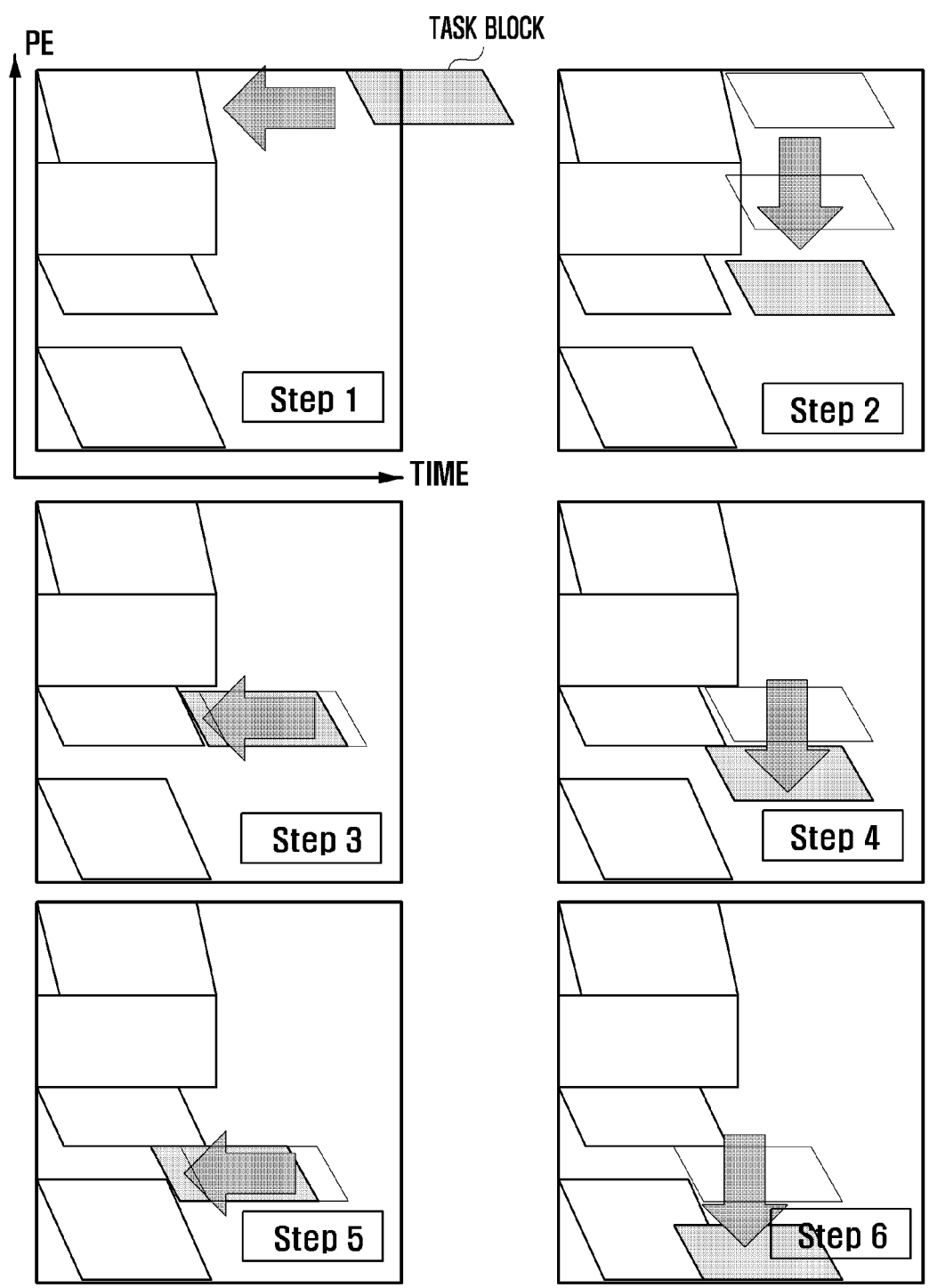
FIG. 9 is a diagram illustrating movement of a task block on the resource allocation plane in accordance with the methodology of FIG. 8, according to an embodiment of the present invention.

FIG. 8 is a flowchart illustrating a task block arrangement methodology on the resource allocation plane performed by the dynamic resource allocation block 450 of FIG. 4, according to an embodiment of the present invention. FIG. 9 is a diagram illustrating movement of a task block on the resource allocation plane in accordance with the methodology of FIG. 8, according to an embodiment of the present invention.

Referring to FIG. 8, the dynamic resource allocation block 450 inserts a task block in a position on the resource allocation plane that does not conflict with a task block that has already been placed on the resource allocation plane, in step 810, for a topmost processing element PE0 on the vertical axis. Specifically, the task block is horizontally moved to the left (decreasing the time value) for PE0, until the task block conflicts with a task block that has already placed. Step S810 of FIG. 8 corresponds to "Step 1" in FIG. 9. The task block may have coordinates (time, PE index) corresponding to its current position on the resource allocation plane.

The dynamic resource allocation block 450 moves the task block downwards (increasing the PE index) until the task block does not conflict with a task block that has already been placed on the resource allocation plane, in S820. Step S820 of FIG. 8 corresponds to "Step 2" in FIG. 9. Specifically, during downward movement, the task block may conflict with a task block that has already been placed, and the task block is moved downwards until a conflict no longer arises.

The dynamic resource allocation block 450 moves the task block horizontally to the left (decreasing the time value) until the task block conflicts with a task block that has already been placed on the resource allocation plane, in step S830. Step S830 of FIG. 8 corresponds to "Step 3" in FIG. 9.

The dynamic resource allocation block 450 moves the task block downwards (increasing the PE index) until the task block does not conflict with a task block that has already been placed on the resource allocation plane, in step S840. Step S840 of FIG. 8 corresponds to "Step 4" in FIG. 9.

The dynamic resource allocation block 450 checks whether all the PEs have been examined, in step S850. When all the processing elements have not been examined, the dynamic resource allocation block 450 returns to step S830 and continues the placement process. In FIG. 9, "Step 5" and "Step 6" are performed, when an unexamined PE remains.

When all the PEs have been examined, the dynamic resource allocation block 450 places the task block at a position on the resource allocation plane corresponding to coordinates with the smallest time value among the coordinates recorded at each step.

Through the above-described procedure, the dynamic resource allocation block 450 places a task block on the resource allocation plane so that both CPU resources and GPU resources are efficiently utilized, enhancing overall system performance.

Figure 10:
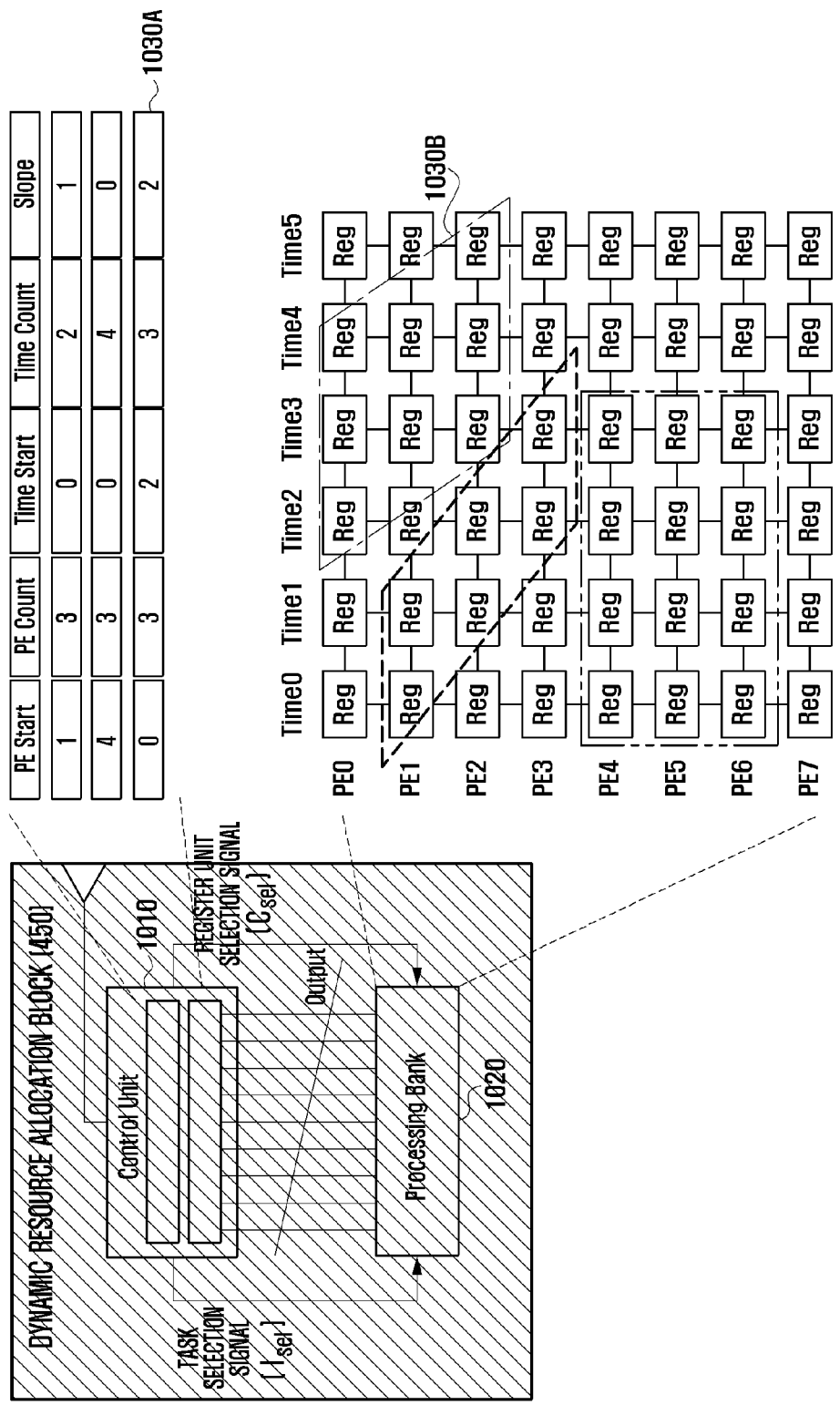
FIG. 10 is a diagram illustrating an internal structure of dynamic resource allocation block 450 of FIG. 4, according to an embodiment of the present invention.

FIG. 10 is a diagram illustrating an internal structure of the dynamic resource allocation block 450 of FIG. 4, according to an embodiment of the present invention. As shown in FIG. 10, the dynamic resource allocation block 450 may include a control unit 1010 and a processing bank 1020.

The control unit 1010 performs and controls a series of operations, as described with respect to FIGS. 6-9, to generate a task block and place the task block on the resource allocation plane. After completing resource allocation, the control unit 1010 has resource allocation information of individual task blocks and commands the processing units, such as the CPU and GPU, to perform operations in accordance with the resource allocation information. As shown in FIG. 10, the resource allocation information contains information on PEs assigned to task blocks ("PE Start", "PE Count"), information on PE usage times ("Time Start", "Time Count"), and information on dependency ("Slope"). The resource allocation information is recorded in field registers.

The control unit 1010 uses the processing bank 1020 to place task blocks on the resource allocation plane. The control unit 1010 outputs a task selection signal $I_{sel}$ and a register unit selection signal $C_{sel}$. The task selection signal $I_{sel}$ is used to identify a task block to be placed, and the register unit selection signal $C_{sel}$ is used to move a task block vertically (without a change in time) on the resource allocation plane.

The processing bank 1020 has a horizontal axis of time and a vertical axis of PEs, and includes many registers on crossings between discrete times and PE indexes.

The resource allocation information is mapped on the processing bank 1020 as indicated by the dotted lines in registers of the processing bank 1020. For example, resource allocation information 1030A corresponds to task block 1030B. Specifically, task block 1030B uses three processing elements from PE0 ("PE Start=0", "PE Count=3"), starts at time 2 ("Time Start=2"), and has a slope of 2 ("Slope=2").

The processing bank 1020 performs actual operations, and main parts thereof may be implemented using combinational logic circuits for fast computation, which is described in detail with reference to FIGS. 11 and 12 below.

Figure 11:
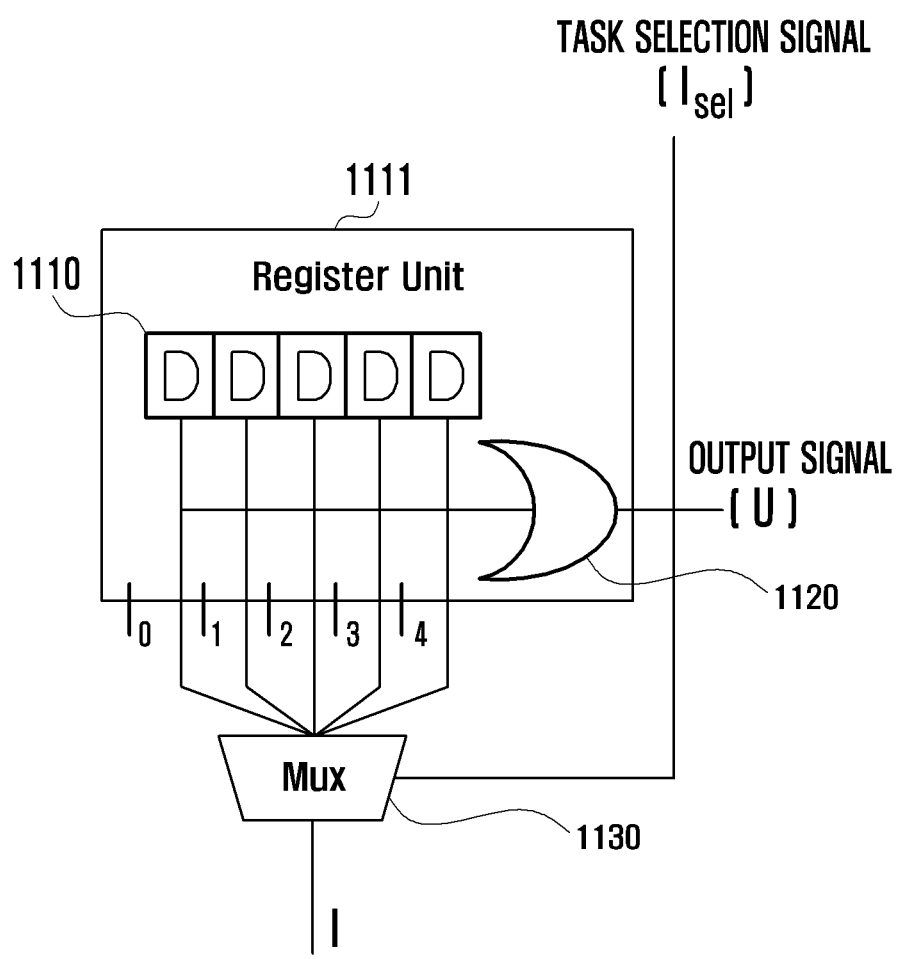
FIG. 11 is a diagram illustrating an internal structure of a register unit constituting a processing bank 1020 of FIG. 10, according to an embodiment of the present invention.

FIG. 11 is a diagram illustrating an internal structure of a register unit constituting the processing bank 1020 of FIG. 10, according to an embodiment of the present invention.

As shown in FIG. 11, a register unit 1111 includes at least one D register 1110 to indicate task block IDs, and an OR gate 1120 to perform "OR" operation on task block IDs. In the embodiment of the present invention illustrated in FIG. 11, there are five D registers 1110. The OR gate 1120 produces an output signal (U). When the output signal is set to '1', it indicates that a task block is present in the register unit. When the output signal is set to '0', it indicates that no task block is present in the register unit.

The task selection signal $I_{sel}$, from the control unit 1010 of FIG. 10, is fed to a multiplexer (Mux) 1130 of the processing bank 1020 and selects a specific task block I. Multiple register units of FIG. 11 are combined together to form the processing bank 1020 of FIG. 10. A combination of register units is described with reference to FIG. 12.

Figure 12:
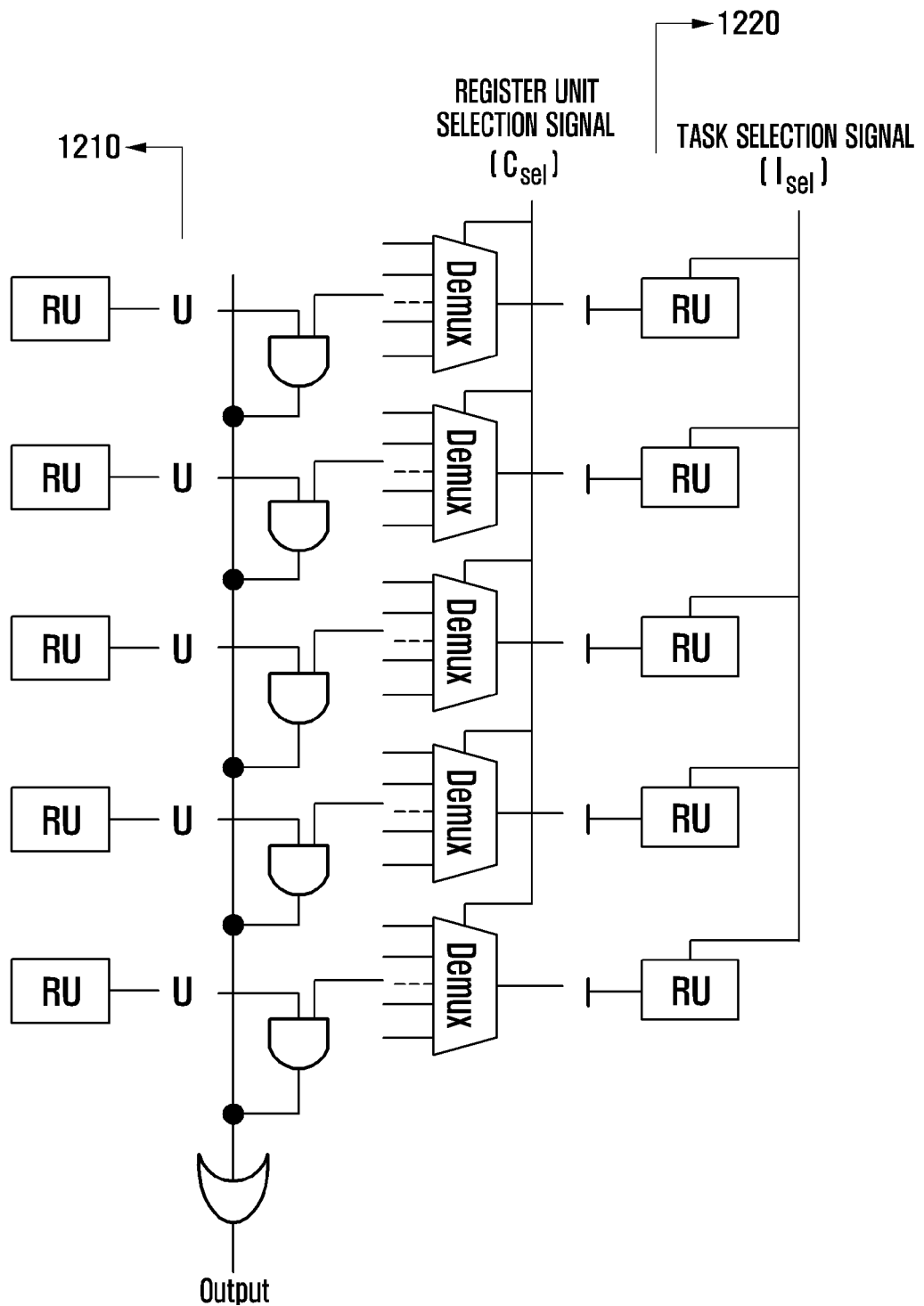
FIG. 12 is a diagram illustrating a combination of register units constituting the processing bank 1020 of FIG. 10, according to an embodiment of the present invention.

FIG. 12 is a diagram illustrating a combination of register units constituting the processing bank 1020 of FIG. 10, according to an embodiment of the present invention. In FIG. 12, front registers 1210 precede rear registers 1220 in time.

Referring to FIGS. 9 and 12, the front registers 1210 of FIG. 12 hold task blocks of FIG. 9 to which resources are already allocated. The rear registers 1220 of FIG. 12 indicate a position to which the task block to be placed is moved downwards without change in time.

A task block (I) is selected according to the task selection signal fed to the rear registers 1220. The selected rear register 1220 is ANDed with all the front registers 1210 ("Step 2", "Step 4" or "Step 6" in FIG. 9) according to the register unit selection signal, outputting '1' when the task block to be placed conflicts with an already placed task block. When a conflict arises with one of the front registers 1210, the final output is set to '1' (Output=1) and the task block to be placed waits in a current position. When the final output is set to '0' (Output=0), the task block to be placed may be moved to the left in one time unit on the time axis.

Accordingly, resource allocation to a task block based on the descriptions corresponding to FIGS. 11 and 12 may be summarized as follows. The control unit 1010 feeds a task selection signal and a register unit selection signal to the processing bank 1020. A task block owns a unique ID, and the task selection signal selects a specific task block ID as shown in FIG. 11. The register unit selection signal is used to compare registers at a current time $(T_n)$ with registers at a preceding time $(T_{n+1})$. Thus, dynamic resource allocation of the present invention is performed by regulating the task selection signal and the register unit selection signal. The combinational logic circuits of FIGS. 11 and 12 may perform N1×N2 operations in a fast and efficient way, where N1 is the number of register units at $T_{n+1}$ and N2 is the number of register units at $T_n$.

After comparison for all task selection and register unit selection signals, when the final output is set to '0', the task block is shifted in time from the current time $(T_n)$ to the preceding time $(T_{n+1})$ and the task block is moved to a register unit enabled by the register unit selection signal.

Figure 13:
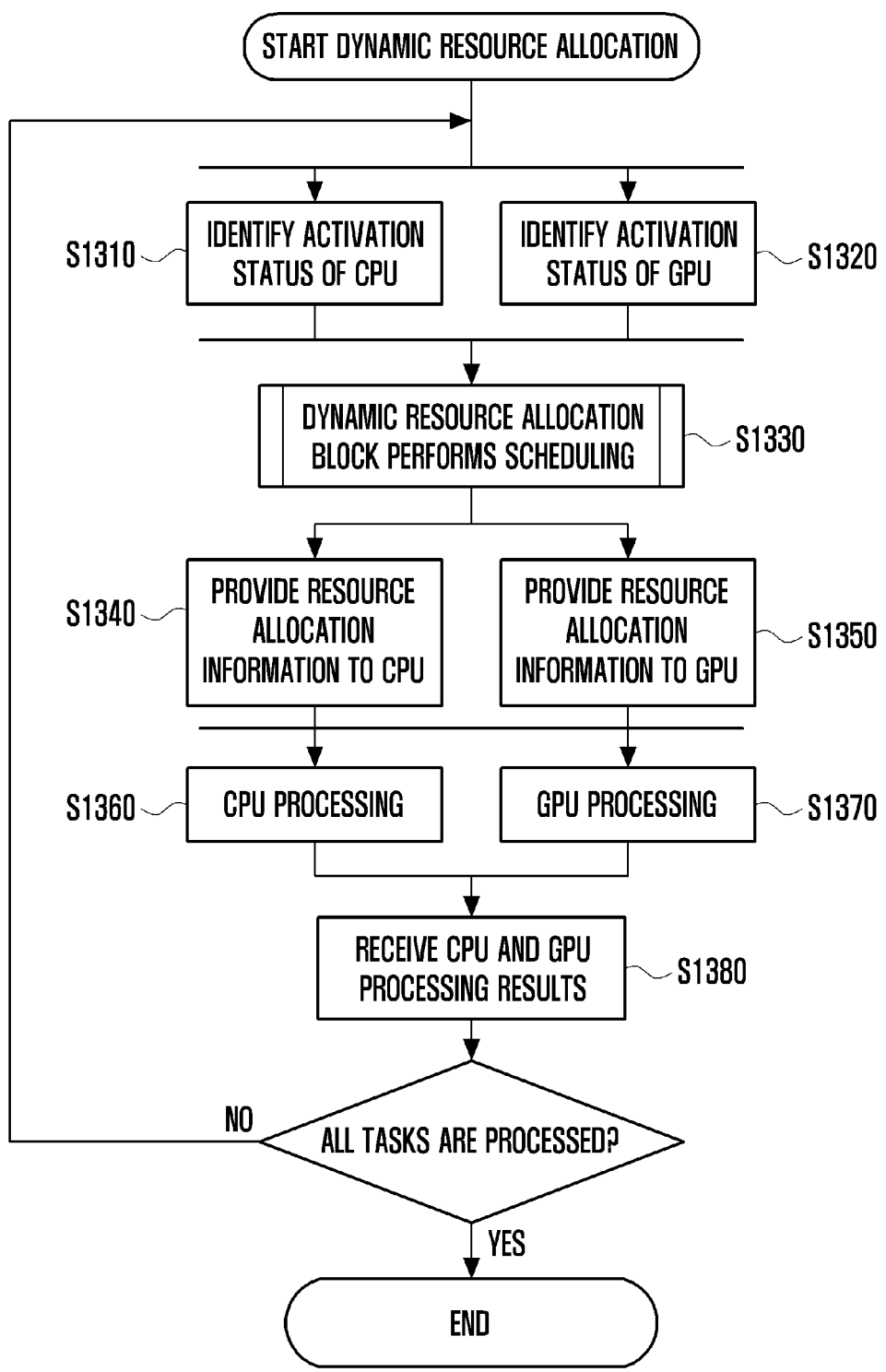
FIG. 13 is a flowchart illustrating a resource allocation methodology performed by the dynamic resource allocation block 450 of FIG. 4, according to an embodiment of the present invention.

FIG. 13 is a flowchart illustrating a dynamic resource allocation methodology of block 450 of FIG. 4, according to an embodiment of the present invention.

Referring to FIG. 13, the dynamic resource allocation block 450 obtains status information of PEs of the CPU and GPU, in steps S1310 and S1320. A PE is in the active state when it is processing a task, and is in the idle state when it is not processing a task.

The dynamic resource allocation block 450 converts a task to be processed into a task block and assigns idle processing elements to the task block, in step S1330. The dynamic resource allocation block 450 forwards the resource allocation information to PEs of the CPU and GPU, in steps S1340 and S1350. PEs of the CPU and GPU perform task processing at given times according to the resource allocation information and record processing results, in steps S1360 and S1370.

The dynamic resource allocation block 450 receives the task processing results from the PEs, in step S1380. The dynamic resource allocation block 450 checks whether all tasks are processed, in step S1390. When all tasks are not processed, the dynamic resource allocation block 450 returns to the initial steps S1310 and S1320 and continues task processing. When all tasks are processed, the dynamic resource allocation block 450 terminates the methodology.

Figure 14:
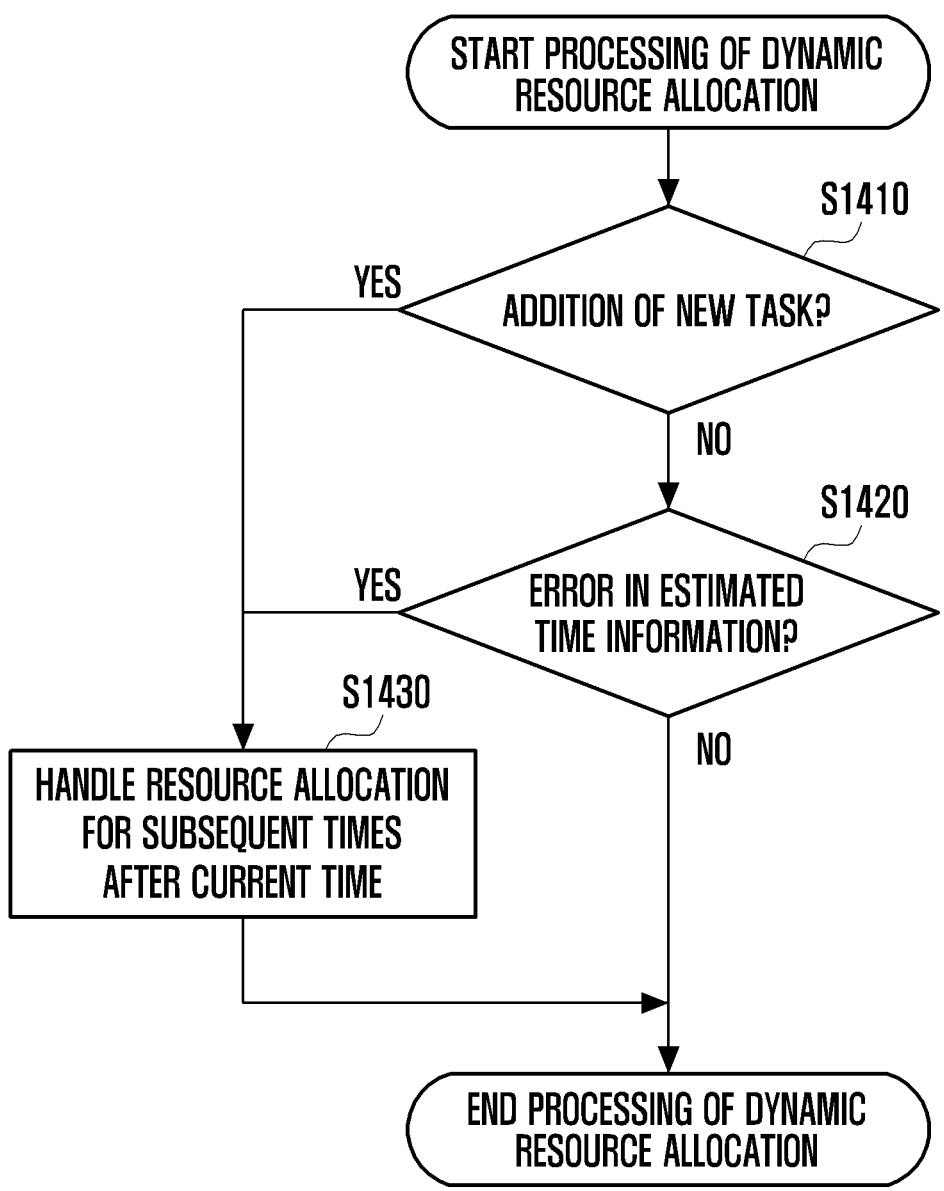
FIG. 14 is a flowchart illustrating a scheduling methodology of step S1330 of FIG. 13, according to an embodiment of the present invention.

FIG. 14 is a flowchart illustrating a scheduling methodology of step S1330 of FIG. 13, according to an embodiment of the present invention.

As described above with respect to FIGS. 7A, 7B, and 7C, the resource allocation method of the dynamic resource allocation block 450 may be applied in the initial placement of task blocks for execution, in the additional placement of a new task block, and in the re-placement of a task block due to errors in its estimated execution time.

In step S1410, it is determined whether dynamic resource allocation involves the addition of a new task. When it involves the addition of a new task, resource allocation is handled for subsequent times after a current time, in step S1430. When it does not involve the addition of a new task, it is determined whether there was an error in estimated time information, in step S1420. When there was an error in estimated time information, resource allocation is handled for subsequent times after the current time, in step S1430. When there was no error in estimated time information, the methodology of FIG. 14 terminates.

Figure 15:
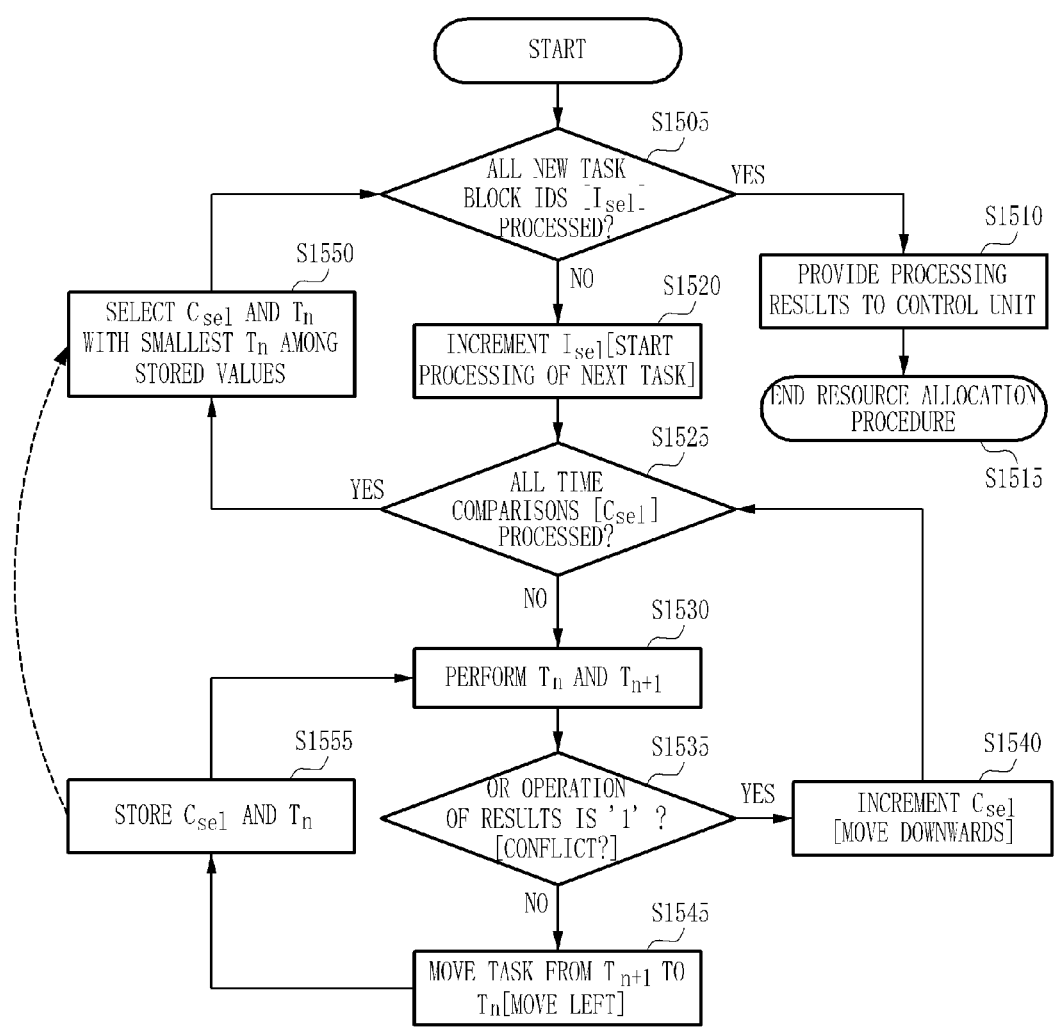
FIG. 15 is a flowchart illustrating a dynamic resource allocation methodology, according to an embodiment of the present invention.

FIG. 15 is a flowchart illustrating a dynamic resource allocation methodology at the processing bank 1020 of FIG. 10, which executing the methodology of FIG. 14, according to an embodiment of the present invention.

In FIG. 15, the processing bank 1020 performs resource allocation for additional placement of a new task block and for re-placement of a task block resulting from an error in its estimated execution time.

The processing bank 1020 checks whether all new task block IDs have been placed, in step S1505. When all task block IDs have been placed, the processing bank 1020 sends processing results to the control unit 1010, in step S1510, and ends the resource allocation procedure, in step S1515.

When all task block IDs have not been placed, the processing bank 1020 starts to place a next task block ID, in step S1520. The processing bank 1020 selects a next task block ID according to the task selection signal from the control unit 1010 and starts to perform resource allocation for the next task block.

The processing bank 1020 performs resource allocation using the register unit selection signal from the control unit 1010. Specifically, as the register unit selection signal is incremented from 1 to 2, 3, 4, ..., the task block is moved downwards without changing the time on the resource allocation plane.

The processing bank 1020 checks whether all operations related to the register unit selection signal have been processed for all time units, in step S1525. When not all operations have been processed, the processing bank 1020 performs $T_n$ and $T_{n+1}$ operations for each value of the register unit selection signal, in step S1530. Specifically, it is determined whether the task block is movable to the left in one time unit on the time axis of the resource allocation plane. In step S1535 it is determined whether an 'OR' operation result is '1', indicating that there is a conflict with a previously placed task block. When the operation result is '1', the processing bank 1020 increments the value of the register unit selection signal, in step S1540. Specifically, the task block is moved downwards on the resource allocation plane. Step 1540 of FIG. 15 corresponds to "Step 2" of FIG. 9. The methodology then returns to step S1525.

When the operation result is '0', the processing bank 1020 shifts the task block in time from $T_{n+1}$ to $T_n$, in step S1545. Specifically, the task block is moved to the left on the horizontal axis of the resource allocation plane, which corresponds to "Step 3" of FIG. 9.

After repeating the above operations, the processing bank 1020 stores coordinates ((time, PE index) or ($T_n$, value of register unit selection signal)) of the task block that has been maximally moved to the left, in step S1555, before returning to step S1530.

When it is determined that the operation of FIG. 15 has been performed for all values of the register unit selection signal in step S1525, the result corresponds to "Step 6" of FIG. 9, and the processing bank 1020 places the task block at a position corresponding to coordinates with the smallest time value among the coordinates recorded at step S1555, in step S1550.

According to the embodiments of the present invention described above, CPU resources and GPU resources in the system can be used in parallel at the same time, increasing overall system efficiency.

Software components including instructions or code for performing the methodologies described herein may be stored in one or more of the associated memory devices (e.g., Read Only Memory (ROM), fixed or removable memory) and, when ready to be utilized, loaded in part or in whole (e.g., into Random Access Memory (RAM)) and executed by the CPU.

While the present invention has been shown and described with reference to certain embodiments thereof, it will be understood by those skilled in the art that various changes in form and detail may be made therein without departing from the spirit and scope of the present invention as defined by the appended claims.

What is claimed is:

1. A method of dynamic resource allocation for a system having a plurality of processing units as resources, the method comprising the steps of:
    receiving information on a task to which the resources are to be allocated;
    partitioning the task into a plurality of parallel task units;
    converting the plurality of parallel task units into at least one task block;
    setting the task block having a shape that is formed based on estimated execution times of the plurality of parallel task units and whether dependency exists between the plurality of parallel task units in the task block;
    allocating the resources to the task block by placing the task block on a resource allocation plane having a horizontal time axis and a vertical processing unit axis,
    wherein allocating the resources to the task block comprises:
        performing horizontal movement of the task block on the resource allocation plane by moving the task block to a position having a smallest time value along a topmost of the plurality of processing units on the vertical processing unit axis while not conflicting with any existing task blocks on the resource allocation plane;
        performing vertical movement by moving the task block down the vertical processing unit axis to coordinates that do not conflict with any existing task blocks on the resource allocation plane; and
        determining whether the horizontal movement and the vertical movement have been performed for all of the plurality of processing units of the system; and
    executing the plurality of parallel task units included in the task block according to the allocated resources.

2. The method of claim 1, wherein allocating the resources to the task block further comprises:
    when the horizontal movement and the vertical movement have not been performed for all of the plurality of processing units, repeating performance of the horizontal movement and the vertical movement until the horizontal movement and the vertical movement have been performed for all of the plurality of processing units; and
    when the horizontal movement and the vertical movement have been performed for all processing units, placing the task block at a position on the resource allocation plane having the smallest time value.

3. The method of claim 2, further comprising, when a new task is received after executing the task, allocating the resources to the new task on the resource allocation plane by repeating the horizontal movement and the vertical movement for the new task.

4. The method of claim 2, further comprising, when processing of a task block to which the resources are already allocated ends earlier than its estimated execution time, allocating the resources to a new task on the resource allocation plane and repeating the horizontal movement and the vertical movement for all remaining task blocks on the resource allocation plane.

5. The method of claim 1, wherein the plurality of processing units comprises one of a core of a Central Processing Unit (CPU) and a processing element of a Graphics Processing Unit (GPU).

6. The method of claim 1, wherein the shape of the task block comprises a first polygon with a right angle for all angles, if no dependency is present between the plurality of parallel task units, and
   wherein the shape of the task block comprises a second polygon with a non-right angle for at least one angle, if dependency is present between the plurality of parallel task units.

7. The method of claim 6, wherein a slope of the second polygon is determined based on an amount of dependency between the plurality of parallel task units.

8. An apparatus for dynamic resource allocation in a system having a plurality of processing units as resources, the apparatus comprising:
   a dynamic resource allocation block that receives information on a task to which the resources are to be allocated, partitions the task into a plurality of parallel task units, converts the plurality of parallel task units into at least one task block, set the task block having a shape that is formed based on estimated execution times of the plurality of parallel task units and whether dependency exists between the plurality of parallel task units in the task block, and allocates the resources to the task block by placing the task block on a resource allocation plane having a horizontal time axis and a vertical processing unit axis,
   wherein the dynamic resource allocation block allocates the resources to the task block by:
      performing horizontal movement of the task block on the resource allocation plane by moving the task block to a position having a smallest time value along a topmost of the plurality of processing units on the vertical processing unit axis while not conflicting with any existing task blocks on the resource allocation plane,
      performing vertical movement by moving the task block down the vertical processing unit axis to coordinates that do not conflict with any existing task blocks on the resource allocation plane, and
      determining whether the horizontal movement and the vertical movement have been performed for all of the plurality of processing units of the system; and
   at least one hardware processing unit that executes the plurality of task units included in the task block according to the allocated resources.

9. The apparatus of claim 8, wherein the dynamic resource allocation block repeats the horizontal movement and the vertical movement when the horizontal movement and the vertical movement have not been performed for all of the plurality of processing units, and places the task block at a position on the resource allocation plane having the smallest time value when the horizontal movement and the vertical movement have been performed for all of the plurality of processing units.

10. The apparatus of claim 9, wherein the dynamic resource allocation block allocates the resources to a new task on the resource allocation plane by repeating the horizontal movement and the vertical movement for the new task, when the new task is received after executing the task.

11. The apparatus of claim 9, wherein the dynamic resource allocation block allocates the resources to a new task on the resource allocation plane and repeats the horizontal movement and the vertical movement for all remaining task blocks on the resource allocation plane, when processing of a task block to which the resources are already allocated ends earlier than its estimated execution time after executing the task.

12. The apparatus of claim 8, wherein the at least one hardware processing unit comprises one of a core of a Central Processing Unit (CPU) and a processing element of a Graphics Processing Unit (GPU).

13. The apparatus of claim 8, wherein the shape of the task block comprises a first polygon with a right angle for all angles, if no dependency is present between the plurality of parallel task units, and
   wherein the shape of the task block comprises a second polygon with a non-right angle for at least one angle, if dependency is present between the plurality of parallel task units.

14. The apparatus of claim 13, wherein a slope of the second polygon is determined based on an amount of dependency between the plurality of parallel task units.

15. An article of manufacture for dynamic resource allocation for a system having a plurality of processing units as resources, comprising a non-transitory machine readable medium containing one or more programs which when executed implement the steps of:
   receiving information on a task to which the resources are to be allocated;
   partitioning the task into a plurality of parallel task units;
   converting the plurality of parallel task units into at least one task block;
   setting the task block having a shape that is formed based on estimated execution times of the plurality of parallel task units and whether dependency exists between the plurality of parallel task units in the task block;
   allocating the resources to the task block by placing the task block on a resource allocation plane having a horizontal time axis and a vertical processing unit axis,
   wherein allocating the resources to the task block comprises:
      performing horizontal movement of the task block on the resource allocation plane by moving the task block to a position having a smallest time value along a topmost of the plurality of processing units on the vertical processing unit axis while not conflicting with any existing task blocks on the resource allocation plane;
      performing vertical movement by moving the task block down the vertical processing unit axis to coordinates that do not conflict with any existing task blocks on the resource allocation plane; and
      determining whether the horizontal movement and the vertical movement have been performed for all of the plurality of processing units of the system; and
   executing the plurality of parallel task units included in the task block according to the allocated resources.

16. The article of manufacturer of claim 15, wherein the shape of the task block comprises a first polygon with a right angle for all angles, if no dependency is present between the plurality of parallel task units, and
   wherein the shape of the task block comprises a second polygon with a non-right angle for at least one angle, if dependency is present between the plurality of parallel task units.

17. The article of manufacturer of claim 16, wherein a slope of the second polygon is determined based on an amount of dependency between the plurality of parallel task units.

* * * * *